United States Patent [19]
Upmeier

[11] 3,719,351
[45] March 6, 1973

[54] EXTRUDER FOR THERMOPLASTIC OR NON-CROSS-LINKED ELASTOMERIC MATERIAL, A MIXING ZONE DEFINED BY A FEED SCREW

[75] Inventor: Hartmut Upmeier, Tecklenburg, Germany

[73] Assignee: Windmoller & Holscher, Lengerich/Westphalia, Germany

[22] Filed: May 4, 1971

[21] Appl. No.: 140,190

[30] Foreign Application Priority Data

May 15, 1970 Germany.....................P 20 23 910.5

[52] U.S. Cl.................................................259/191
[51] Int. Cl.................................................B01f 7/08
[58] Field of Search.........259/191, 193, 192, 194, 97, 259/9, 10; 425/200, 207, 208, 209

[56] References Cited

UNITED STATES PATENTS

| | | | |
|---|---|---|---|
| 2,817,876 | 12/1957 | Gandelli | 259/191 |
| 3,115,674 | 12/1963 | Schrenk | 259/191 |
| 3,300,810 | 1/1967 | Gregory | 259/191 |
| 3,564,651 | 2/1971 | Covington | 425/200 |

Primary Examiner—Robert W. Jenkins
Attorney—Fleit, Gipple & Jacobson

[57] ABSTRACT

In an extruder for thermoplastic or non-cross-linked elastomeric material, a mixing zone defined by a feed screw for the material comprises at least one mixing ring on a cylindrical core portion of the screw, the mixing ring being apertured for the flow of material through the ring. The apertures are formed by a plurality of circumferentially distributed passages which are alternately oppositely inclined to the longitudinal axis of the screw.

7 Claims, 4 Drawing Figures

PATENTED MAR 6 1973    3,719,351

INVENTOR
Hartmut UPMEIER

By
Fleit, Gipple & Jacobson
his ATTORNEYS

EXTRUDER FOR THERMOPLASTIC OR NON-CROSS-LINKED ELASTOMERIC MATERIAL, A MIXING ZONE DEFINED BY A FEED SCREW

The invention relates to the extrusion of thermoplastic and non-cross-linked elastomeric material and more particularly to a feed screw to be used in extruders for such material.

In the extrusion of thermoplastic or non-cross-linked elastomeric material, high requirements are placed on the uniformity or homogeneity of the material and these requirements cannot be met with conventional feed screws without the provision of special homogenizing and mixing zones. Radial and axial homogeneity in the elongated stream of fed material should exist with regard to the temperature of the material, its viscocity when molten (plasticity) as well as the distribution of any additives, for example pigments, fillers and/or certain reagents such as propellants for foamed plastics or cross-linking chemicals.

To achieve homogeneity, various forms of feed screws exhibiting special shearing and mixing zones have been developed. In a shearing zone having a gap of definite width, the fed material is brought to a certain minimum viscocity whilst in a subsequent mixing zone or zones radial and axial homogeneity are brought about, in some cases with a simultaneous reduction in temperature so as to avoid the disadvantages inherent in excessively high temperatures. For example, it is known to insert in the extruder a so-called torpedo member which has a certain length and a smooth cylindrical surface. The mixing effect brought about by this has proved inadequate. Mixing zones working on the principle of dividing the flow of the material have brought about better results. In one embodiment a mixing rib extending in the same direction as the feeding threads of the screw is provided with a plurality of radial slots or such a slotted mixing rib is set at an inclination opposite to that of the feeding threads. It is also known to use damming or baffle plates which are mounted on a smooth torpedo member and provided with a multiple of radial slots, usually in association with several other such slotted plates.

Although the last mentioned construction effects much more thorough mixing, it has been found that mixing in a radial direction is still inadequate in cases where there is a considerable temperature difference between the feed screw and the wall of the cylinder in which the feed screw rotates; consequently, the temperature at the center of the fed stream of material is several degrees higher than that in the marginal regions of the stream. This is particularly evident when using thermally neutral feed screws, i.e. untempered feed screws, in which the mixing zone is machined rather deeply and therefore enhances a reduction in the temperature of the stream of material.

The invention aims to provide an extruder in which the feed screw operates on the principle of dividing the flow of the stream of material and effects proper homogenization in a radial direction with respect to the temperature of the material as well as its consistency.

According to the invention, there is provided an extruder for thermoplastic or non-cross-linked elastomeric material, comprising a feed screw rotatable in a cylinder, the feed screw having a core which defines an annual flow gap with the wall of the cylinder, wherein the feed screw is provided with a mixing zone containing a mixing ring which extends from the core of the screw to the cylinder wall and which is provided with a plurality of apertures for the flow of material therethrough, the apertures being formed by oblique passages extending alternately from near the core to near the cylinder wall, and vice versa.

With such a construction of mixing ring, and it is preferred to use two or more such mixing rings at a spacing from one another, the molten layers near the center of the stream of material are interchanged with layers from near the cylinder wall to bring about a better mixing effect. Further, and this is particularly important for an untempered feed screw, the hot layers near the center of the stream are led towards the cylinder wall which is usually more intensively cooled and the cooler marginal layers are then returned from near the cylinder wall towards the feed screw to cool the latter, this bringing about a considerable improvement in the radial uniformity of the temperature of the fed stream of material.

As viewed in the direction of flow of the material, the mixing zone is preferably preceded by a feeding and shearing zone, the length and width of the aforementioned annular flow gap in the mixing zone giving a volume which is at least equal to the total volume of the gap in the feeding and shearing zone so that the time for which the material is in the mixing zone will be at least equal to the time for which it is in the preceding zones. The or each mixing ring may be in the form of a replaceable disc on the feed screw. This simplifies production and makes it less expensive to replace worn parts.

The inlet ends of the passages in the or each mixing ring are preferably provided with inlet cavities which extend unilaterally in the direction of rotation of the feed screw. The outlet ends of the passages may have corresponding outlet cavities which extend unilaterally opposite to the direction of rotation of the feed screw. This facilitates feeding of the material with the least possible resistance along a substantially helical course about the feed screw. Additional flow-dividing mixer elements may of course be disposed between the mixing rings to intensify the mixing effect.

An example of the invention is illustrated in the accompanying diagrammatic drawing in which.

The feed screw is provided with a feeding section A, a shearing and homogenizing section B and a mixing section C. The shearing section B is illustrated in simplified form as a multi-ribbed ring which is more fully described in our prior British Patent Application No. 26218/71 (German Application P 20 19 522.6).

Figure 1:
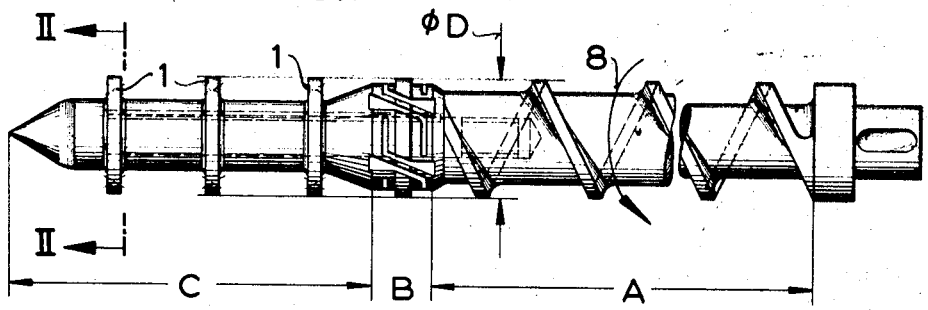
FIG. 1 is a side elevation of a feed screw.
Figure 2:
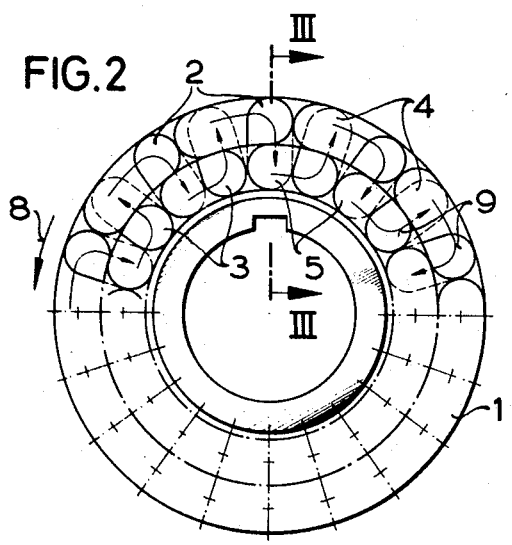
FIG. 2 is a front elevation of a mixing ring as viewed in the direction of the arrows II—II in FIG. 1.
Figure 3:
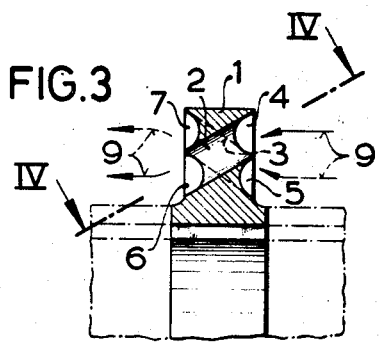
FIG. 3 is a section on the line III—III in FIG. 2.
Figure 4:
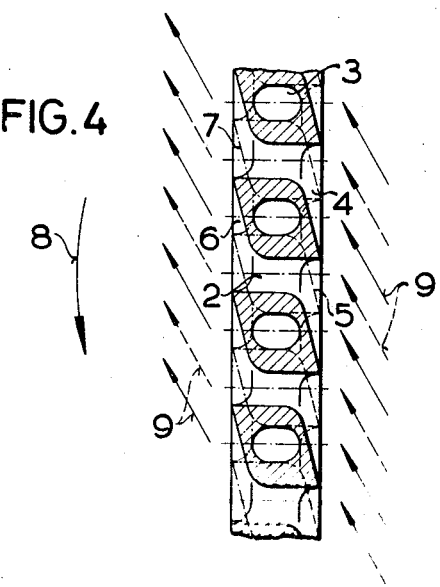
FIG. 4 is a projection through a row of passages in the mixing ring taken on the line IV—IV in FIG. 3.

The feed screw of FIG. 1 is designed to rotate in a cylinder of an extruder, the inside diameter of the cylinder wall being indicated by the arrows $\phi D$. The core of the feed screw is much larger in the feeding section A than in the mixing section C and consequently an annular flow gap defined between the cylinder wall and the core of the feed screw is wider in the mixing section or zone C, the width preferably being from 0.15 to 0.20 times the internal cylinder diameter. In the illustrated embodiment, the mixing section C is provided with three mixing ribs 1 which, for production reasons and to facilitate replacement after wear, are in the form of separate rings placed over the core of the feed screw.

Machined into each ring 1 there are a plurality of alternatively oppositely intersecting passages 2, 3 which are juxtaposed in a circumferential direction. At least the upstream sides of the passages are provided with unilateral inlet cavities 4, 5 but corresponding outlet cavities 6, 7 are preferably also provided on the downstream sides of the passages. When forming these cavities, the intended direction of rotation of the feed screw (indicated by the arrow 8) should be taken into account because it is to be instrumental in causing the overall flow 9 of molten material to follow a substantially helical course about the screw core. The material readily enters the passages through the inlet cavities 4, 5 and leaves them through the cavities 6, 7 whilst encountering the least possible resistance to flow.

By means of the repeated interchange of material from near the core to near the cylinder wall and vice versa, the fed material is intensively homogenized and, as is particularly important for untempered feed screws, the hot material near the core of the screw approaches the usually more intensively cooled cylinder wall whilst the relatively cool marginal layers of material approach the core and reduce the temperature thereof, thus improving the overall radial uniformity in the temperature of the stream of material.

To avoid excessive shearing action on the material located in the mixing section C, the annular gap between the cylinder wall and the feed screw core in this section should be quite deep whilst the length of the mixing section is preferably chosen so that the volume of extrudable material is located in the mixing section is at least equal to the total volume in the feeding and shearing sections, whereby the time for which the material is located in the mixing section will likewise be at least equal to the time it stays in the preceding sections.

The mixing rings 1 can be fairly easily machined on copying milling machines or on normal milling machines with indexing heads.

It is within the scope of the invention as defined in the appended claims to provide between the individual intersecting passages additional holes such as axial holes and/or radial slots, although the radial mixing effect would then be somewhat worse. Similarly, the mixing section C could be interposed intermediate the length of the feeding section A but those screwthreads of the feeding section disposed downstream of the mixing section would then detrimentally influence the homogeneity of the molten material. Further, in order to intensify the mixing effect, radial kneading cams or pins or slotted discs or other flow-dividing mixing elements may be provided between the mixing rings 1.

I claim:

1. An extruder for thermoplastic or non-cross-linked elastomeric material, comprising a feed screw rotatable in a cylinder, the feed screw having a core which defines an annular flow gap with the wall of the cylinder, wherein the feed screw is provided with a mixing zone containing a mixing ring which extends from the core of the screw to the cylinder wall and which is provided with a plurality of apertures for the flow of material therethrough, the apertures being formed by oblique passages extending alternately from near the core to near the cylinder wall, and vice versa.

2. An extruder according to claim 1 comprising two or more such mixing rings at a spacing from one another.

3. An extruder according to claim 1, wherein the mixing zone is preceded, as viewed in the direction of flow of the material, by a feeding and shearing zone, the length and width of said annular flow gap in the mixing zone giving a volume which is at least equal to the total volume of the gap in the feeding and shearing zone.

4. An extruder according to claim 1, wherein the or each mixing ring is in the form of a replaceable disc on the feed screw.

5. An extruder according to claim 1, wherein the inlet ends of the passages are provided with inlet cavities which extend unilaterally in the direction of rotation of the feed screw.

6. An extruder according to claim 1, wherein the outlet ends of the passages are provided with outlet cavities which extend unilaterally opposite to the direction of rotation of the feed screw.

7. An extruder according to claim 2 including further flow dividing mixer elements disposed between the mixing rings.

* * * * *